(12) United States Patent
Schirmer et al.

(10) Patent No.: US 12,339,675 B2
(45) Date of Patent: Jun. 24, 2025

(54) METHOD FOR DETERMINING A MOTION PATH ON A SURFACE

(71) Applicant: Robert Bosch GmbH, Stuttgart (DE)

(72) Inventors: Robert Schirmer, Schoemberg (DE); Sebastian Scherer, Tuebingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/549,257

(22) PCT Filed: May 25, 2022

(86) PCT No.: PCT/EP2022/064167
§ 371 (c)(1),
(2) Date: Sep. 6, 2023

(87) PCT Pub. No.: WO2022/253658
PCT Pub. Date: Dec. 8, 2022

(65) Prior Publication Data
US 2024/0160224 A1    May 16, 2024

(30) Foreign Application Priority Data
Jun. 2, 2021 (DE) ................. 10 2021 205 620.2

(51) Int. Cl.
G05D 1/43    (2024.01)
G05D 1/622   (2024.01)
(Continued)

(52) U.S. Cl.
CPC ............ *G05D 1/43* (2024.01); *G05D 1/622* (2024.01); *G05D 2105/10* (2024.01);
(Continued)

(58) Field of Classification Search
CPC ...... G05D 1/43; G05D 1/622; G05D 2105/10; G05D 2105/15; G05D 2111/10;
(Continued)

(56) References Cited

U.S. PATENT DOCUMENTS 7,805,220 B2 *   9/2010   Taylor ................. G05D 1/0274
                                                      318/568.17
2019/0085579 A1 * 3/2019  Braidic ............... G05D 1/0038
(Continued)

FOREIGN PATENT DOCUMENTS

| DE | 102015119501 A1 | 5/2017 |
| DE | 102018114892 A1 | 12/2019 |
| EP | 2407847 B1 | 5/2019 |

OTHER PUBLICATIONS

International Search Report for PCT/EP2022/064167, Issued Sep. 22, 2022.
(Continued)

*Primary Examiner* — Thomas Ingram
(74) *Attorney, Agent, or Firm* — NORTON ROSE FULBRIGHT US LLP

(57) ABSTRACT

A method for determining a motion path on a surface in an environment, along which motion path a mobile appliance, in particular a robot, preferably a domestic robot or a robot vacuum cleaner, is intended to move. The method includes obtaining environment information and determining a region of the surface intended to be covered by the motion of the mobile appliance; determining, while taking into account the environment information, whether within the region there is at least one uneven area in the surface that can be negotiated by the mobile appliance; and determining the motion path while taking into account the at least one uneven area, if there is one. A mobile appliance is also described.

12 Claims, 2 Drawing Sheets

(51) Int. Cl.
  *G05D 105/10* (2024.01)
  *G05D 105/15* (2024.01)
  *G05D 111/10* (2024.01)
  *G05D 111/50* (2024.01)

(52) U.S. Cl.
  CPC ...... *G05D 2105/15* (2024.01); *G05D 2111/10* (2024.01); *G05D 2111/52* (2024.01); *G05D 2111/54* (2024.01)

(58) Field of Classification Search
  CPC ............ G05D 2111/52; G05D 2111/54; G05D 1/0246; G05D 1/0219
  See application file for complete search history.

(56) References Cited

U.S. PATENT DOCUMENTS

| | | | |
|---|---|---|---|
| 2020/0117210 A1* | 4/2020 | Ren | G05D 1/0274 |
| 2020/0142052 A1* | 5/2020 | Liu | G01S 13/865 |
| 2020/0246970 A1* | 8/2020 | Chao | G05D 1/0219 |
| 2021/0096560 A1 | 4/2021 | Al-Mohssen et al. | |
| 2022/0397906 A1* | 12/2022 | Sneyders | A01B 69/008 |

OTHER PUBLICATIONS

Acar et al., "Morse Decompositions for Coverage Tasks," The International Journal of Robotics Research, vol. 21, No. 4, 2002, pp. 331-344. <http://biorobotics.ri.cmu.edu/papers/paperUploads/A028807.pdf> Downloaded Aug. 30, 2023.

* cited by examiner

METHOD FOR DETERMINING A MOTION PATH ON A SURFACE

FIELD

The present invention relates to a method for determining a motion path on a surface in an environment, along which motion path a mobile appliance, such as a robot vacuum cleaner or robot mop or another domestic robot, is intended to move, to an arithmetic logic unit and a computer program for carrying out said method, and to a mobile appliance.

BACKGROUND INFORMATION

Mobile appliances such as robot vacuum cleaners or robot mops or other domestic robots typically move along a motion path over a surface in an environment to be worked on, such as a residence. To do this, the motion path is generally planned and determined such that it is both as short as possible and also covers the entire desired region to be vacuumed, for example.

SUMMARY

According to the present invention, a method for determining a motion path, an arithmetic logic unit and a computer program for carrying out the method, and a mobile appliance, are provided. Advantageous example embodiments of the present invention are disclosed herein.

The present invention deals with mobile appliances that move or are intended to move along a determined motion path on a surface in an environment. One typical example of a mobile appliance of this kind is a domestic robot such as a robot vacuum cleaner and/or robot mop. As already mentioned at the outset, in this case a motion path of this kind is generally determined such that it is both as short as possible and also covers the entire desired region to be vacuumed, for example. Even though the present invention is predominantly described in the following with reference to domestic robots, it is just as applicable to other robots or mobile appliances that follow or are intended to follow a motion path, e.g., lawn mowers, floor cleaning appliances or street cleaning appliances, such as street sweeper robots (or automated street sweepers), and the like.

For mobile appliances such as domestic robots, the motions in the environment (e.g., in the household or residence) are performed in particular in a systematic and planned manner. To do this, domestic robots have sensors such as laser scanners (distance meters) or cameras, for example, in order to perceive their environment and, on the basis of corresponding information such as positions of, distances from, and dimensions of (non-negotiable) obstacles, to create a map of their environment within which they can ultimately plan their motions, e.g., the systematic vacuuming of an entire residence (also called "coverage path planning" or "coverage problem"). These robots typically perceive obstacles such as walls or furniture in their environment and enter these in the map. In this way, a region of the surface intended to be covered by the motion of the mobile appliance or robot can thus be determined.

As has now become apparent, there are also uneven areas which, although negotiable per se by the mobile appliance, could result in damage when they are negotiated or driven over, either to the mobile appliance or the surface. The mobile appliance can also get stuck, get caught, or encounter other problems. Uneven areas of this kind are in particular steps, raised areas, and/or sunken areas in the surface. In the case of a domestic robot, examples are the edges or borders of rugs (which are lying on the floor and can be driven over), different heights between the floors of two adjacent rooms, or different floor coverings. In the case of a street sweeper robot, this can be (low) curbsides, for example.

The present invention provides an option for overcoming or at least reducing this problem. According to an example embodiment of the present invention, to do this, environment information is obtained and a region of the surface intended to be covered by the motion of the mobile appliance is determined. Taking into account the environment information, it is then determined whether within the region (intended to be covered by the motion path) there is at least one uneven area in the surface that can be negotiated by the mobile appliance. If there is at least one uneven area of this kind, the motion path is determined while taking into account the at least one uneven area.

Expediently, according to an example embodiment of the present invention, an uneven area is only taken into account as such here if it exceeds at least one predetermined critical measurement, e.g., a certain height or depth, or length or width (otherwise, it can be assumed that an uneven area does not pose a problem). The mobile appliance is then in particular also moved along the determined motion path such that the surface is vacuumed or mopped, for example.

In this case, at least some of this environment information is obtained using a camera, for example (it thus includes camera information or camera data). At least some of it can, however, also be obtained using an inertial sensor (or a plurality of inertial sensors) and/or odometry. In this case, odometry denotes a method for estimating the position and orientation (position estimation) of the mobile appliance on the basis of the data from its propulsion system. Appliances driven by wheels use the number of wheel revolutions for this, for example.

A camera or sensors such as inertial sensors are, e.g., integrated in the mobile appliance and can be used to capture the environment information. This information can then be relayed to an arithmetic logic unit (controller) in the mobile appliance, in which arithmetic logic unit the motion path is then determined as explained above. It is, however, also possible for this environment information, possibly together with other data, to be transmitted to a server or computing center (e.g., by wireless communication), where the motion path can then be determined as explained above and sent back to the mobile appliance.

In this case, according to an example embodiment of the present invention, determining the motion path preferably comprises minimizing the number of negotiations of the at least one uneven area by the motion path, while taking into account the total length of the motion path. At the very least, this number should be lower than the number of negotiations of these uneven areas if these were not taken into account as such. In the case of a rug on a floor, the borders of which constitute uneven areas of this kind, in the previous approach the motion path would pass over the rug multiple times, for example (the rug per se thus would not differ from the rest of the surface or floor whatsoever). When the present invention is applied in a preferred specific embodiment, however, the motion path would first extend outside the rug, i.e., the region outside the rug is vacuumed first, and then lead up onto the rug once, where it would then pass around the rug multiple times (depending on the size of the rug) such that, for example, the rug is vacuumed, and then would ultimately end thereon or run off the rug again, where necessary.

In this way, the mobile appliance or domestic robot avoids frequently driving over these problematic edges or uneven areas, thus getting stuck much less often and protecting both itself and the floor or surface. A slightly longer total length of the motion path can be readily accepted for this purpose.

One particular aspect here is that the mobile appliance identifies, e.g., problematic edges or uneven areas using its sensors (e.g., a camera), enters them in its map in addition to regular (non-negotiable) obstacles (such as walls, furniture), and lastly uses this information for motion planning such that the number of negotiations of the problematic edges is minimized.

The data from the sensor used are preferably constantly evaluated in order to identify critical edges (uneven areas). This can be done using an artificial neural network, for example, which runs on an onboard computer (controller) or on special hardware for accelerated evaluation on the mobile appliance. For this purpose, a neural network of this kind can, for example, be trained on the basis of example images having corresponding uneven areas, such as borders of rugs or steps in the floor. The environment information, i.e., images, captured by the camera can then be analyzed to establish whether relevant edges or uneven areas are present in the images.

According to an example embodiment of the present invention, an alternative procedure for identifying critical edges is provided by the above-mentioned inertial sensor (i.e., an inertial measuring unit) and odometry (wheel odometry), for example. In this case, where one floor covering merges into another, or generally when there is an uneven area, it is identified that the mobile appliance "jumps" (i.e., undergoes a vertical acceleration) and/or the wheel odometry is briefly inconsistent. By recording these "notable moments" during mapping (determining the region of the surface intended to be covered by the motion of the mobile appliance), the position of critical edges (uneven areas) can be derived or determined. It goes without saying that both variants can also be combined with a camera and inertial sensor or odometry provided that the required equipment or sensors are available for both variants.

While the mobile appliance or robot is moving and creating its map, e.g., using an existing mapping method (e.g., using a distance sensor and identified obstacles and/or using a camera and visual features), the positions of the identified critical edges or uneven areas within the map can be stored together with this map. Depending on the type of edge, they can have different levels of criticality, i.e., for example, are or are not taken into account when determining the motion path. Other distinctions are also possible, e.g., uneven areas or edges that should not be driven over at all, or should only be driven over a few times.

During path planning (determining the motion path), in addition to the coverage of the entire area (region) to be cleaned and the shortest possible total distance of the route to be traveled, the number of times critical edges are crossed, and their severity or criticality, are also taken into account, which, generally speaking, gives a different path planning result from that which can be obtained in accordance with the previous approach.

Advantageously, according to an example embodiment of the present invention, determining the motion path comprises dividing the region into a plurality of sub-regions, within each of which a motion sub-path is determined, wherein the motion sub-paths are linked together and form the motion path, and wherein the at least one uneven area delimits at least one sub-region at least in part. In particular, when there are multiple uneven areas or edges, a sub-region of this kind can be completely delimited. For instance, a rug can form a distinct sub-region, which is delimited by the borders of the rug as edges or uneven areas. Expediently, determining each motion sub-path then comprises minimizing a length of the (entire) motion path.

According to the approach described in Acar, Choset, Rizzi, Atkar, Hull; "Morse Decompositions for Coverage Tasks;" the International Journal of Robotics Research, 2002, 21(4), 331-344," in modern robots the coverage problem is formulated as a "generalized traveling salesman problem," for example. The generalized traveling salesman problem is defined by a graph of V (nodes), E (edges), w (edge weights). For the coverage problem, this is achieved as follows:

The area to be covered (region of the surface intended to be covered by the motion of the mobile appliance), given by a mapping algorithm, is divided into discrete parcels or polygons ("decomposition cells"). When the parcels or polygons have certain properties, coverage paths (motion sub-paths) can be calculated for these parcels or polygons in a routine manner. For instance, convex polygons can be completely covered by "meandering back and forth" (one example of this is shown in the drawings).

Following the decomposition of the area to be covered, a set of solutions is calculated for each parcel, for example; this can be done by, e.g., varying the starting point (the robot meanders starting from the top left or starting from the bottom right, etc.). The set of all the solutions, grouped by parcel, then forms the nodes of the generalized traveling salesman V.

For example, the set of edges E is calculated by all the possible transitions between node pairs in V. The edge weights w encode the costs of a parcel and a transition path (negotiating an uneven area). These costs can reflect any criteria, e.g., path length, number of turns of the robot, etc.

The solution to this coverage problem is thus equivalent to said generalized traveling salesman problem, with one path being selected per parcel.

The consideration of uneven areas when determining the motion path, as proposed in the context of the present invention, can particularly preferably be utilized in the first part of this method: in the polygonal decomposition, i.e., when dividing up the region of the surface intended to be covered by the motion of the mobile appliance into sub-regions. Here, critical edges (uneven areas) are, e.g., classified as a separate polygon, whereupon this is used as a parcel and the robot no longer crosses it, except to reach the parcel and to leave it, where applicable.

In this context, it is also possible that the negotiation of an edge or uneven area of this kind is taken into account with higher costs than other motions. The proposed approach according to the present invention also makes it possible to calculate the edge weights w, since the robot would thus avoid the critical edges even on transition paths (negotiations).

The specific solution to this (modified) traveling salesman problem thus remains the same as before in principle, a modification merely being made in the first step during the decomposition into parcels or sub-regions. For further embodiments for utilizing this (modified) traveling salesman problem in mobile appliances, reference is made to the above-mentioned document.

Preferably, according to an example embodiment of the present invention, determining the motion path comprises minimizing costs of a length of the (entire) motion path, wherein costs for motion path portions in which the at least one uneven area is crossed are weighted more highly than for other motion path portions. This approach can, for example, be handled without the above-mentioned traveling salesman problem, but the undesired negotiations of uneven areas can still be reduced or minimized. A combination of both variants is also possible, i.e., different sub-regions can be treated differently, for example. Other path planning options are also possible.

According to an example embodiment of the present invention, objects can also preferably be identified using machine learning in order to bypass certain object categories which are not necessarily (non-negotiable) obstacles (e.g., cables or small items) in a targeted manner, in particular if they are not taken into account as relevant negotiable uneven areas. It is, however, also possible for cables, for example, to be treated as relevant uneven areas; for instance, a distinct sub-region can be formed by a cable, potentially together with walls, when determining the motion path.

According to an example embodiment of the present invention, the capturing of the environment information (and the identification of uneven areas) for determining the motion path are carried out during (initial) mapping of the room, for example, i.e., during determination of the region of the surface intended to be covered by the motion of the mobile appliance. For example, this can be carried out again when the mobile appliance is started up for the first time (in a new environment), but also each time the mobile appliance has passed along the motion path. In this way, the identification of the uneven areas can be continually improved, for example.

An arithmetic logic unit according to the present invention, for example a controller of a mobile appliance such as a domestic robot, is configured, in particular programmed, to carry out a method according to the present invention.

The present invention also relates to a mobile appliance such as a domestic robot, in particular a robot vacuum cleaner and/or robot mop, a lawn mower, or a floor cleaning appliance or street cleaning appliance. In addition to the above-mentioned arithmetic logic unit, the mobile appliance then in particular also comprises at least one sensor unit, such as a camera and/or an inertial sensor, in order to capture the environment information.

It is also advantageous to implement a method according to the present invention in the form of a computer program or computer program product comprising program code for carrying out all the method steps, since this entails particularly low costs, in particular if an executing controller is also used for other tasks and is therefore present anyway. Suitable data media for providing the computer program are, in particular, magnetic, optical, and electrical memories, for example hard disks, Flash memories, EEPROMs, DVDs, etc. Downloading a program via computer networks (internet, intranet, etc.) is also possible.

Further advantages and embodiments of the present invention become apparent from the description herein and the figures.

The present invention is shown schematically in the figures on the basis of an exemplary embodiment and will be described below with reference to the figures.

DETAILED DESCRIPTION OF EXAMPLE EMBODIMENTS

Figure 1:
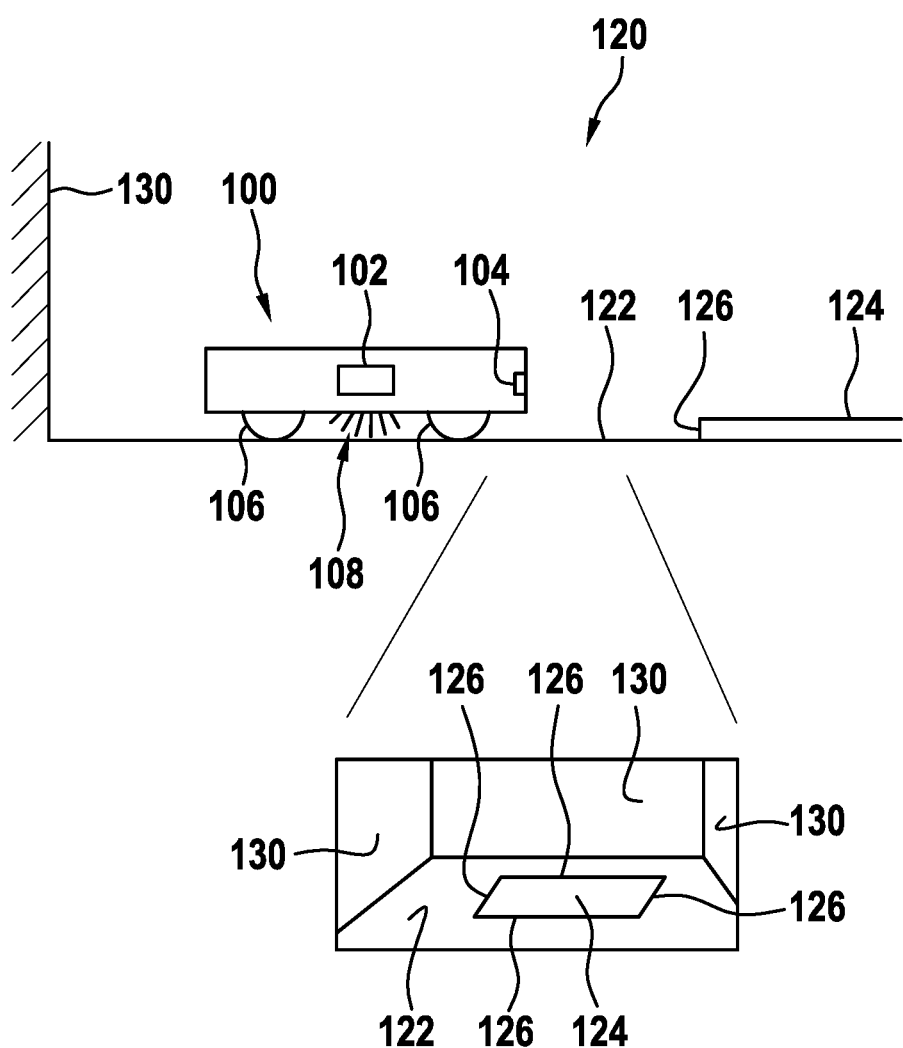
FIG. 1 schematically shows a mobile appliance according to the present invention in a preferred specific embodiment in an environment.

FIG. 1 schematically shows a mobile appliance 100 according to the present invention in a preferred specific embodiment in an environment 120, e.g., in a room. As shown in the upper part of FIG. 1, by way of example the mobile appliance 100 is a robot vacuum cleaner comprising wheels 106, a suction device 108, an arithmetic logic unit 102 configured as a controller, and a camera 104.

The robot vacuum cleaner 100 is positioned on a surface 122, i.e., a floor, of the room 120, which is delimited on the left-hand side by a wall 130 in the form of an obstacle, for example. Lying on the floor to the right of the robot vacuum cleaner 100 is a rug 124, which is also part of the surface and is intended to be vacuumed by the robot vacuum cleaner just like the floor. In this case, the borders 126 of the rug 124 each form an uneven area in the surface 122 which can be negotiated by the robot vacuum cleaner 100.

The lower part of FIG. 1 is a view of the room 120 from the point of view of the camera 104 of the robot vacuum cleaner 100, e.g., an image taken thereby. This image shows all four borders 126 of the rug 124, and also further walls 130 of the room. By suitably evaluating such images or photographs (when the robot vacuum cleaner is moving through the room), these borders 126 can be identified as negotiable uneven areas.

Figure 2A:
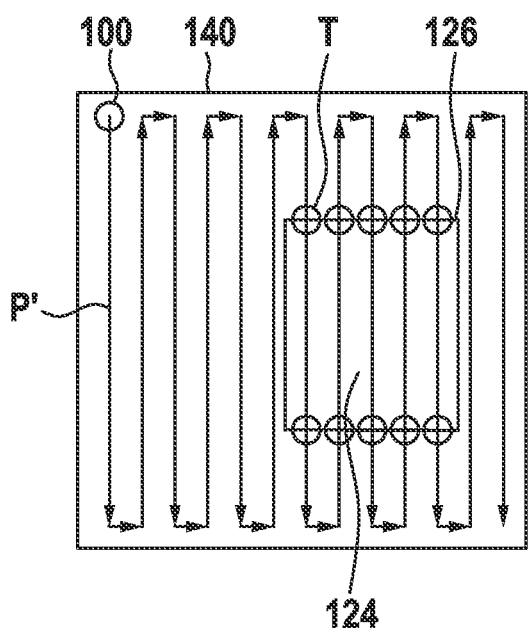
FIGS. 2A and 2B schematically show a motion path which has been determined using a method according to the present invention in a preferred specific embodiment.

FIG. 2A schematically shows, on the left-hand side, a region 140 which is intended to be covered by the motion of the robot vacuum cleaner 100 (by way of example, arranged in the upper left-hand corner). This region 140 can be a region of the surface (cf. FIG. 1) that is intended to be vacuumed. By way of example, the region 140 includes a rectangular room, delimited by walls. It goes without saying that, in practice, the region can extend over multiple rooms, for example, and is also delimited by furniture in the form of non-negotiable obstacles, for example.

The rug 124 is included in the region 140. FIG. 2A then shows a motion path P' which the robot vacuum cleaner is intended to follow or along which it is intended to move; in this case, the rug 124 and its borders 126 are not taken into account any further. The motion path P' shown here is instead produced as a result of the length of the motion path being minimized, for example. In this case, by way of example, the entire region 140 can be taken into account directly, it being unnecessary here to divide it into parcels or the like (since a simple polygon is present anyway).

FIG. 2A also shows that the robot vacuum cleaner 100 has to negotiate or drive over the borders 126 of the rug, i.e., uneven areas in the surface, multiple times along the motion path P'. Each negotiation T is marked by a circle. This motion path P', containing the many negotiations, can result in the robot vacuum cleaner being damaged or can result in it getting caught and thus in the vacuuming process being interrupted.

Figure 2B:
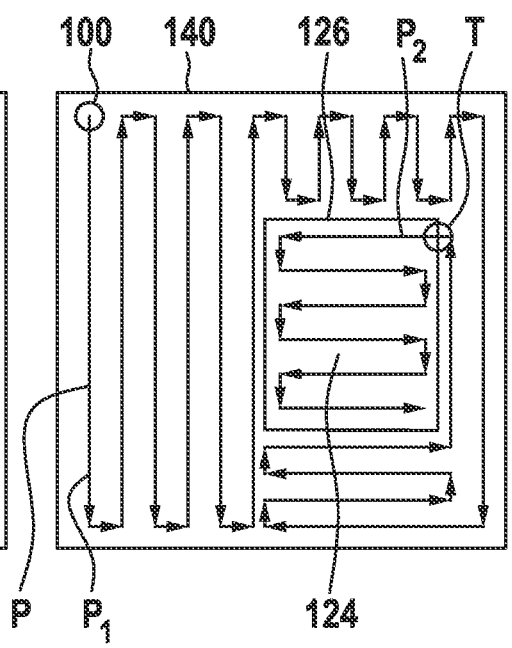

FIG. 2B on the right-hand side again shows the region 140. FIG. 2B shows a motion path P' which the robot vacuum cleaner is intended to follow or along which it is intended to move; in this case, the rug 124 and its borders 126 are taken into account as uneven areas. By way of example, the motion path P shown here results from two motion sub-paths P1 and P2 which are linked together.

The first motion sub-path P1 covers the entire sub-region outside the rug 124, and the second motion sub-path P2 covers the rug 124 as a sub-region. This results in just one negotiation T, and the motion path P ends on the rug. This motion path P can be obtained by the borders 126 of the rug 124 being taken into account as uneven areas which together form a polygon (in this case, a rectangle). This can be taken into account as a separate sub-region or parcel in the context of the above-mentioned generalized traveling salesman problem.

As a result, the entire region 140 is covered by the motion path P here, too; in comparison with the motion path P' according to FIG. 2A, however, there are considerably fewer negotiations T. This reduces the risk of damage and of the vacuuming process being interrupted.

Figure 3:
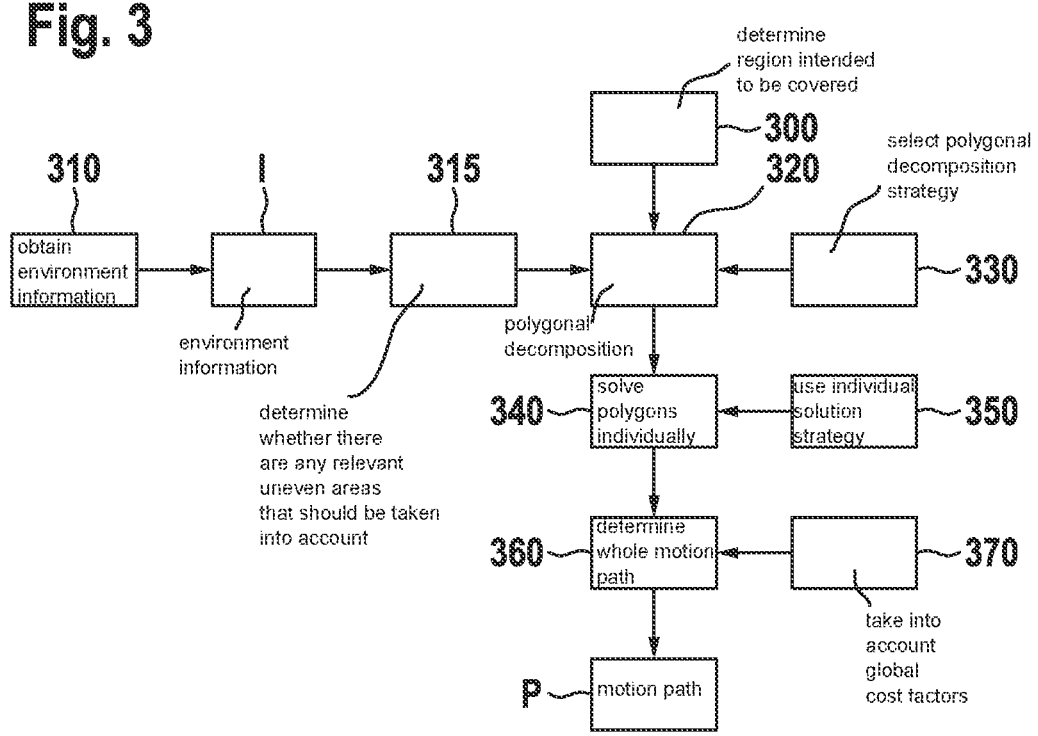
FIG. 3 schematically shows a sequence of a method according to the present invention in a preferred specific embodiment.

FIG. 3 schematically shows a sequence of a method according to the present invention in a preferred specific embodiment, which in particular comprises determining a motion path, as explained in greater detail in relation to FIGS. 2A and 2B, in particular FIG. 2B, for example.

In a first step 300, e.g., when or after the robot vacuum cleaner is switched on, the region intended to be covered by the motion of the robot vacuum cleaner within the environment is determined, for example. This can be done in a routine manner, e.g., using distance sensors and cameras, as mentioned at the outset. In other words, mapping is carried out.

In a step 310, environment information I is also obtained, e.g., by the camera of the robot vacuum cleaner. In this case, the environment information I includes, e.g., data or images that indicate possible uneven areas, such as the above-mentioned borders of the rug. In a step 315, it is then determined whether within the region there are actually relevant uneven areas that should be taken into account.

In a step 320, polygonal decomposition of the already determined region is carried out, for example; in the process, in particular the environment information I or the uneven areas obtained in accordance with step 310 are taken into account. Furthermore, in the process, in accordance with step 330, a particular polygonal decomposition strategy is selected or taken into account, that is to say, for example, a strategy for which type of polygon the region is divided into. For example, in this case a consideration can be made as to whether convex polygons can be created, whether these can be followed by way of parallel lines (as parts of the motion path), whether even rectangles or squares are possible as polygons, or whether there should be separate polygons; the latter case may be particularly relevant for taking into account the uneven areas or critical edges.

In a step 340, polygons obtained in this way are then each solved individually, for example using a solution generator. Here, solving a polygon means that a motion sub-path is determined for the polygon in question, i.e., a sub-region of the region as a whole. In this case, in particular in accordance with step 350, an individual solution strategy can be used for each polygon. For example, it can be considered whether the appliance is intended to travel along dominant axes or how great the distance from potential obstacles (or boundaries of the polygon) is.

This then typically results in multiple solutions for each of the multiple polygons, i.e., in multiple potential motion sub-paths. In a step 360, the whole motion path resulting from stringing together respective motion sub-paths (taking into account necessary connecting paths where applicable) can be determined, i.e., in particular optimized and/or minimized. Here, in particular in accordance with step 370, global cost factors for the motion path can be taken into account. In so doing, the total costs of the motion path can be determined as a combination of length, turns, and negotiations of critical edges or uneven areas, for example. This ultimately results in a motion path P along which the robot vacuum cleaner is moved.

What is claimed is:

1. A method for determining a motion path on a surface in an environment, along which motion path a mobile appliance including a robot or a domestic robot or a robot vacuum cleaner, is intended to move, the method comprising the following steps:
   obtaining environment information and determining a region of the surface intended to be covered by motion of the mobile appliance;
   determining, while taking into account the environment information, whether within the region there is at least one uneven area in the surface that can be negotiated by the mobile appliance; and
   determining the motion path while taking into account the at least one uneven area,
   wherein the determining of the motion path includes minimizing a number of negotiations of the at least one uneven area by the motion path, while taking into account a total length of the motion path and/or wherein the determining of the motion path includes minimizing costs of a length of the motion path, wherein costs for motion path portions in which the at least one uneven area is crossed are weighted more highly than for other motion path portions.

2. The method as recited in claim 1, wherein the determining of the motion path includes dividing the region into a plurality of sub-regions, within each of which a motion sub-path is determined, wherein the motion sub-paths are linked together and form the motion path, and wherein the at least one uneven area delimits at least one sub-region at least in part.

3. The method as recited in claim 2, wherein the determining of each motion sub-path includes minimizing a length of the motion path.

4. The method as recited in claim 1, wherein the at least one uneven area includes at least one of: a step in the surface, a raised area in the surface, a sunken area in the surface.

5. The method as recited in claim 1, wherein the region of the surface intended to be covered by the motion of the mobile appliance is determined while taking into account information on at least one obstacle that cannot be negotiated by the mobile appliance.

6. The method as recited in claim 1, wherein at least some of the environment information is obtained using a camera and/or an inertial sensor and/or odometry.

7. The method as recited in claim 1, wherein, when the mobile appliance has passed along the entire determined motion path once, the motion path is determined or adjusted again.

8. The method as recited in claim 1, wherein the mobile appliance is moved along the determined motion path.

9. An arithmetic logic unit configured to determine a motion path on a surface in an environment, along which motion path a mobile appliance including a robot or a domestic robot or a robot vacuum cleaner, is intended to move, the arithmetic logic unit is configured to:
   obtain environment information and determining a region of the surface intended to be covered by motion of the mobile appliance;

determine, while taking into account the environment information, whether within the region there is at least one uneven area in the surface that can be negotiated by the mobile appliance; and determine the motion path while taking into account the at least one uneven area, wherein the determining of the motion path includes minimizing a number of negotiations of the at least one uneven area by the motion path, while taking into account a total length of the motion path and/or wherein the determining of the motion path includes minimizing costs of a length of the motion path, wherein costs for motion path portions in which the at least one uneven area is crossed are weighted more highly than for other motion path portions.

10. A mobile appliance, comprising:

at least one sensor unit configured to capture environment information; and an arithmetic logic unit configured to determine a motion path on a surface in an environment, along which motion path a mobile appliance including a robot or a domestic robot or a robot vacuum cleaner, is intended to move, the arithmetic logic unit is configured to:

obtain the environment information and determining a region of the surface intended to be covered by motion of the mobile appliance, determine, while taking into account the environment information, whether within the region there is at least one uneven area in the surface that can be negotiated by the mobile appliance, and determine the motion path while taking into account the at least one uneven area, wherein the determining of the motion path includes minimizing a number of negotiations of the at least one uneven area by the motion path, while taking into account a total length of the motion path and/or wherein the determining of the motion path includes minimizing costs of a length of the motion path, wherein costs for motion path portions in which the at least one uneven area is crossed are weighted more highly than for other motion path portions.

11. The mobile appliance as recited in claim 10, wherein the mobile appliance is: i) a domestic robot and/or a robot vacuum cleaner and/or a robot mop as a floor cleaning appliance or street cleaning appliance, or ii) a lawn mower.

12. A non-transitory machine-readable storage medium on which is stored a computer program for determining a motion path on a surface in an environment, along which motion path a mobile appliance including a robot or a domestic robot or a robot vacuum cleaner, is intended to move, the computer program, when executed by an arithmetic logic unit, causing the arithmetic logic unit to perform the following steps:

obtaining environment information and determining a region of the surface intended to be covered by motion of the mobile appliance;

determining, while taking into account the environment information, whether within the region there is at least one uneven area in the surface that can be negotiated by the mobile appliance; and determining the motion path while taking into account the at least one uneven area, wherein the determining of the motion path includes minimizing a number of negotiations of the at least one uneven area by the motion path, while taking into account a total length of the motion path and/or wherein the determining of the motion path includes minimizing costs of a length of the motion path, wherein costs for motion path portions in which the at least one uneven area is crossed are weighted more highly than for other motion path portions.

* * * * *